(12) United States Patent
Gavit (10) Patent No.: US 6,508,431 B1
(45) Date of Patent: Jan. 21, 2003

(54) GUIDE PACKING RECORDING MEDIA ALONG WITH CARTRIDGES AND APPARATUS INCORPORATING SUCH GUIDES

(75) Inventor: Stephan E. Gavit, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 09/614,575

(22) Filed: Jul. 12, 2000

(51) Int. Cl.$^7$ .............................................. B65H 23/04
(52) U.S. Cl. .................................. 242/548.3; 242/615.4
(58) Field of Search .................................. 242/349, 346, 242/346.1, 345, 345.2, 345.3, 348, 358, 547, 548, 548.2, 548.3, 548.4, 566, 615.4

(56) References Cited

U.S. PATENT DOCUMENTS

| | | | |
|---|---|---|---|
| 1,942,869 A | * 1/1934 | McMaster | 242/346.1 |
| 4,136,839 A | * 1/1979 | Walter | 242/547 |
| 4,289,285 A | * 9/1981 | Ishida et al. | 242/345.3 |
| 4,541,588 A | 9/1985 | Sato | |
| 4,789,110 A | * 12/1988 | Sakaguchi et al. | 242/548.4 |
| 4,854,517 A | 8/1989 | Watanabe et al. | |
| 4,909,455 A | 3/1990 | Sakaguchi et al. | |
| 5,224,641 A | * 7/1993 | Spicer | 242/615.4 |
| 5,533,690 A | 7/1996 | Kline et al. | |
| 5,645,241 A | 7/1997 | Koga et al. | |
| 5,777,823 A | 7/1998 | Gavit | |
| 6,045,086 A | 4/2000 | Jeans | |

OTHER PUBLICATIONS

"Transient Discharge of Entrained Air From a Wound Roll", Transactions of the ASME, vol. 65, pp. 804–805, Dec. 1998.
"Air Entrainment During Steady–State Web Winding", Transactions of the ASME, vol. 64, pp. 916–917, Dec. 1997.

* cited by examiner

Primary Examiner—William A. Rivera
(74) Attorney, Agent, or Firm—Timothy J. Martin; Michael R. Henson; Rebecca A. Gegick

(57) ABSTRACT

Apparatus for winding a tape medium is disclosed to include a winding hub, a drive operative to rotate the hub, a rigid packing arm and a support member for the packing arm. The packing arm rides on the surface of the tape pack and may be linear or arcuate and may be off the wind axis of the hub. A first end portion of the packing arm may also overlap the hub. The packing arm may be formed of a non-ferrous material, such as a ceramic, and it may be biased into contact with the tape pack surface. A longitudinal groove can be provided to collect debris. A plurality of packing arms equiangularly spaced relative to the hub may be employed. The packing arm can be supported on the frame of the apparatus or it can be mounted in a cartridge that provides a supply of tape.

38 Claims, 7 Drawing Sheets

GUIDE PACKING RECORDING MEDIA ALONG WITH CARTRIDGES AND APPARATUS INCORPORATING SUCH GUIDES

FIELD OF THE INVENTION

The present invention broadly concerns read/write electronic devices wherein a tape is used for recording or retrieving data. Specifically, the present invention concerns guides that facilitate packing of tape onto a take-up hub. The guide according to the present invention may be used with such electronic device or incorporated into tape cartridges. The device is particularly directed to prevent misregistration of the tape that is caused by air entrainment.

BACKGROUND OF THE INVENTION

Tape media are used to store data in a compact and accessible manner. Typically, this has been accomplished by winding the elongated strip of tape onto a reel. Typically, such reels are constructed to have a central hub that has annular flanges and a width slightly greater than the width of the tape. It is also known to use flangeless hubs in winding tape media. In either case, the hub is rotated about a central winding axis, and the length of tape is wrapped circumferentially around the hub. Such winding results in a tape pack as successive layers of tape build in a radial direction. The edges of the tape generally define a pair of oppositely disposed surfaces generally along planes that are perpendicular to the winding axis; the width of the tape pack is thus defined by the distance between these two planes. The flanges of a flanged reel are intended to protect the tape pack.

Storage reels of tape, whether flanged or flangeless (for example as used in cartridges) may be placed on the machine during use. The length of the tape is then passed through the machine so that information may be placed on the tape or retrieved therefrom. During this process, the length of tape is transferred onto a take-up reel or hub that is either a part of the machine itself, included within the cartridge or that is mounted and demounted from such machine. After being transported through the machine, the tape may be rewound onto the storage reel and removed from the machine.

In the beginning, the speeds associated with the transfer of tape between the storage reel and the take-up reel were relatively slow. The registration of the edges of the tape layers to form the opposite surfaces of the tape pack was not especially critical. Often, the edges of consecutive layers of the tape might be slightly off-set from one another or "stagger-wrapped". Such was the case for both magnetic recording tape and tapes used, for example, in the motion picture industry (where a series of photographic images are placed consecutively on the tape medium).

In more recent times, the speed of wrapping or winding a tape onto either the storage reel or the take-up reel has increased dramatically. This is especially true in the electronic information storage arena wherein magnetic tape, or "film" or optical tape is used to store data, both for on-line usage as well as for archival purposes. In such electronic devices, a magnetic coil is used as a transducer to imprint data magnetically on a moving band of magnetic film; thereafter, when the film is advanced across the transducer, the data may be accessed. The ability to write data rapidly onto a film and the accessibility of data to be read from the film is a function of two variables: (1) the density of storage; and (2) the speed at which the tape medium may be transported across and accurately written/read by the transducer.

As was explained in my earlier U.S. Pat. No. 5,777,823, issued Jul. 7, 1998, it is important that the lateral edge of the tape moving in a transport direction be properly registered along a reference plane, called the datum, so that the data may be accurately input and retrieved from the tape medium. Support of the tape during transport is therefore critical, and typically employs guide rollers, air bearing and the like as is known in the art.

As tape transport speeds have increased, a problem has evolved which is interchangeably called "scatterwind" or "stagger-wrap". Where tape is wound at high speed onto a hub, the tape entrains air. That is, air within the boundary of air adjacent to the tape moves into the tape pack and becomes entrapped between the advancing layer and those layers already on the tape pack. Some of this converging wedge of air is laterally displaced at the "nip" which is the point of tangency between the film pack and the incoming (or outgoing) layer of tape. Despite this displacement, a significant portion of the air is nonetheless trapped between the layers of the film pack such that the radial outward layers of the tape pack float slightly with respect to one another because they are separated by the spiral-air bearing created by the self-pressurized air film.

When the tape pack is subsequently brought to rest, the spiral-air bearing is ejected so as to decrease the pack's radius until all adjacent tape layers have come into direct contact. As this occurs, the layers may shift laterally with respect to one another resulting in a tape pack that has a significant amount of stagger wrap. Indeed, at the present time, there can be as much as 0.010 to 0.040 (about 0.25 mm to 1.0 mm) stagger between adjacent tape edges.

Stagger-wrap presents a problem to the industry where the alignment of the lateral edge of the tape is critical with the read/write transducer. If a tape pack has a significant amount of stagger wrap, the perturbation of this stagger wrap propagates through the advancing tape layer as it is played off of the reel or hub. This causes potential error in either reading or writing the data. Therefore, it is desirable to eliminate the misregistration of the layers forming the tape pack by guiding the registration of the incoming tape layer as it winds onto the hub.

As should be appreciated, when tape is wound between a take-up reel and a storage reel, it is necessarily under a physical tension "T". The force required to displace a tape of length "L" through a misregistration "d" is given by equation: F=Td/L. By maximizing the length an minimizing misregistration, forces on the tape will be minimal subjecting the tape to the smallest and gentlest guiding force.

Others have recognized the air entrainment problem of high speed winding, and attempts have been made to address this problem. A general discussion of the air entrainment issue is discussed, for example, in M. B. Keshaven and J. A. Wickert, "Transient Discharge of Entrained Air from Wound Roll", *Transactions of the ASME*, Vol. 65, 804–805 (December 1988) and in M. B. Keshaven and J. A. Wickert, "Air Entrainment During Study-State Web Winding", *Transactions of the ASME*, Vol. 64, pages 916–917 (December 1997).

In U.S. Pat. No. 6,045,086 to Jeans, issued Apr. 4, 2000, a background discussion is set forth which describes various techniques employed in an attempt to reduce the stagger wrap or scatterwind. As explained in the '086 Patent, previous attempts at neatly packing a film onto a film pack include the use of self-packing glass reels, liner sheets, magnetic forces and mechanical forces. In the first Keshaven et al article noted above, the use of packing or "lay-on rollers" or drive belts that preload the tape against the roll have been used. However, those solutions can deform the tape. Moreover, the fragility of the thinner recording media and next-generation systems may effectively preclude the use of such mechanical means to reduce the thickness of the entrained air film.

Of the techniques noted above, self-packing glass reels are precision tape reels wherein the flanges are formed of glass. The flanges are slightly radially converging so that the decreased spacing of the flanges constrains lateral motion of the tape. These glass reels are high priced and require precise alignment or other guide elements in the tape path. In addition, the use of such self-packing glass reels do not eliminate the inertia of the flanged reels during acceleration and deceleration of the tape take-up and storage reels.

Magnetic winding devices rely on magnetic fields to align the film. This works only on magnetic films and is not possible to use to optical films. Mechanical forces from pulleys or rollers are used to urge the film into registration as it would onto the tape pack. However, these mechanical devices apply high radial pressure to the film to squeeze out air, and can damage the film by the mechanical contact therewith.

These problems were addressed in the '086 Patent mentioned above. The '086 Patent discloses a method and apparatus for rewinding a film to reduce scatter winds. The film packing guide is structured as a flexible sheet of elastic material that extends radially of the tape pack and is canted at an acute angle to a surface defined by the respective edges fo the tape layers forming the tape pack. Thus, the elastic packing guide contacts the circumferential edge of the outer most tape layer at a location displaced downstream of the nip.

Despite the advantages provided by prior art structures, there remains a need for improved tape packing guides and apparatus that are operative to wind a tape medium with reduced misregistration for play and storage. Moreover, there is a need to provide improved packing guides that place less stress on the tape medium during motion. The present invention is directed to providing such improved structure and apparatus which can be incorporated of a tape system, as part of a take-up or storage reel and as tape storage cassettes.

Accordingly, there remains a need to provide new and improved take-up and storage devices for data. There is a continued need for devices that can read and write tape film at increasingly higher speeds. There is a further need for storage and take up hubs that are packed with reduced misalignment of the tape layers thus avoiding stagger-wrap. The present invention is directed to meeting these needs.

SUMMARY OF THE INVENTION

It is an object of the present invention to provide a new and useful structure which can be incorporated into a tape drive system or which can be formed as a tape reel or cartridge that reduces the misregistration of the stagger-wrap as the tape is wound into a tape pack.

It is another object of the present invention to provide an apparatus that includes a rigid packing arm that more precisely registers a link of tape incoming onto a tape pack to reduce the stagger wrap thereof, especially where the rigid packing arm is biased against the tape pack.

It is yet another object of the present invention is to provide apparatus including a packing arm that more precisely registers a link of tape incoming onto a tape pack to reduce the stagger wrap thereof while employing a low magnitude force on the tape.

Yet a further object of the present invention is to provide a packing guide that helps register a tape as it is wound onto a tape pack and which concurrently removes light burrs resulting from the slitting process and also lightly burnishes the tape edge.

According to the present invention, then, an apparatus is provided to wind a tape medium relative to a frame structure so that the tape medium is wound into a tape pack with reduced misregistration for play and storage. Broadly, this apparatus includes a hub that is supported by the frame structure and that is operative to wrappingly receive the tape medium. A drive engages the hub and selectively rotates the hub about a wind axis so that the length of the tape medium is wound thereon to form a spool-like tape pack. This tape pack has a pair of oppositely disposed surfaces defined by edges of the registered layers forming the tape pack. The apparatus according to the present invention includes a rigid packing arm that has a proximal end portion that is disposed proximately to the hub and that extends longitudinally from the hub to a distal end portion located at the circumference of the tape pack. The packing arm has a contact surface that is operative to contact a first surface of the tape pack. A support member supports the packing arm in contact with the first surface of the tape pack.

The packing arm can have an arcuate configuration or it can be linear, but, in either case, it should contact the first surface of the tape pack at a location adjacent to the nip. Here, also, the contact surface of the packing arm may be provided with a longitudinally extending groove that is located between the distal end portion and the proximal end portion of the packing arm. This groove allows air to laterally bleed at the nip region so as to achieve a better tape pack. The distal end portion of the packing arm preferably overlaps the hub and, if desired, is resiliently biased and in contact with the surface of the tape pack. Biasing may be accomplished by an elastomeric material or, alternatively, a spring, such as a leaf spring. The packing arm is preferably constructed of a nonferrous material, such as a ceramic, and the contact surface is highly polished.

Preferably, there are a plurality of rigid packing arms associated with each hub. Each of the packing arms thus includes a proximal end portion located at the hub and extending longitudinally from the hub to a distal end portion at the circumference at the tape pack. The packing arms are preferably disposed equiangularly about the wind axis. The packing arms are oriented such that at least one of the packing arms always contacts the first surface adjacent to the nip as the tape pack is wound. Here, again, each packing arm may be provided with a longitudinal groove. Alternatively, the tape pack may be sandwiched between a pair of opposed rigid packing arms.

While the packing arms can be arcuate in configuration, it is important that each packing arm has a radial length that is greater than its circumferential length. The hub may be disposed in a cartridge housing that is mountable and demountable relative to the frame structure. Where a cartridge is used, the packing arm is mounted to the cartridge housing.

The present invention also contemplates a tape reel assembly, such as a cartridge, that is adapted to be mounted to and demounted from a tape drive apparatus for winding a tape medium therein. Here, the tape reel assembly includes a housing and a hub rotatably disposed in the housing. This hub is again operative to wrappingly receive the tape medium thereon to form a spool-like tape pack with a portion of the tape medium contacting the tape pack at the tangential nip. A packing arm is disposed in the housing and includes a proximal end portion at the hub and extends longitudinally from the hub to a distal end portion at the circumference of the tape pack. This packing arm again has a contact surface operative to contact the first surface of the tape pack. The packing arm can be constructed as described above and there can be a pair of opposed packing arms or a plurality of packing arms equiangularly disposed about the wind axis. Here, it is preferred that the hub be a flangeless hub.

It should be understood that the present invention provides an improvement to a tape drive system wherein the tape drive system typically has a frame, a read/write head disposed on the frame, first and second winding members each disposed on the frame and adapted so that a tape medium may be selectively wound thereon and unwound therefrom to form a respective tape pack. A tape support structure is disposed on the frame and is operative to support a tape for transport between the first and second winding members and across the read/write head. First and second drives are each operative to rotate the first and second winding members, respectively. The improvement thus includes a rigid packing arm having a proximal end portion located proximally to an outer edge of at least one of the winding members and extending from the outer edge to a distal end portion at the circumference of the tape pack. The packing arm has a contact surface operative to contact the first surface of a respective tape pack, and a support member is employed to support the packing arm in contact with the first surface of the respective tape pack. Here, again, the packing arm may be constructed as described above.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention concerns the winding or packing of tape media on hubs or reels for use with the data storage industry in such a manner as to eliminate stagger-wrap (also referred to as scatterwind). This invention is an improvement to tape transport apparatus that is operative to transport a tape medium in a tape transport direction across a read/write transducer in order to either place data on or access data from the tape. While the present invention is described specifically with respect to magnetic tape media, it should be understood that the principles described herein may be employed with other tape media without restriction. Moreover, the term "read/write transducer" as used herein may refer to a write transducer, a read transducer or a transducer that is able to perform both reading and writing functions. The present invention may be implemented as one or more guides that can be mounted to the frame of the tape drive apparatus, that can be included in a tape cartridge for the tape transport apparatus or that can be mounted to a winding hub support.

Figure 1:
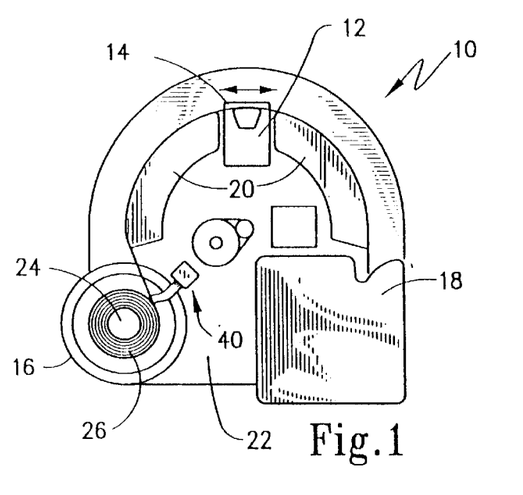
FIG. 1 is a front view in elevation showing a diagram of the tape transport apparatus according to the present invention including a packing guide according to a first embodiment of the present invention.

With reference, then, to FIG. 1, a diagram of a representative tape transport apparatus is shown. Here, tape transport apparatus 10 includes a read/write transducer 12 and a plurality of air bearings 20 which support a tape 14 for transport in a tape transport direction "T". A suitable tape drive 16 is provided to move tape 14 in the transport direction. A cartridge 18 is provided and represents a mountable and demountable tape cartridge for the storage of the data tape. The various components of tape transport apparatus 10 are supported by a frame 22. Frame 22 supports a flangeless take-up hub 24 which may be rotatably driven by drive 16, which is preferably an electronic motor, so that tape 14 is wound into a spool-like tape pack 26.

Figure 2:
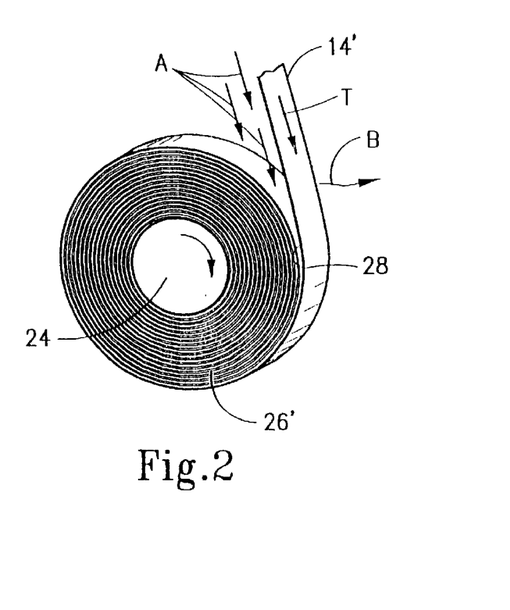
FIG. 2 is a perspective view of a tape spool illustrating the entrainment of air.

With reference to FIG. 2, it should be appreciated that the winding of a tape 14' into a tape pack 26' at high speeds can result in the unwanted entrainment of air between adjacent layers of tape 14' and the tape pack 26'. As illustrated, the rapid advancement of tape 14' in tape transport direction "T" results in a converging wedge of air represented by arrows "A". As this wedge of air approaches nip 28 air begins to be laterally ejected at nip 28 as is shown by arrows "B" in FIG. 2. However, an undesired portion of air becomes entrained between adjacent layers of tape pack 26' thus creating a spiral-like air bearing that is especially present in the outer most layers of tape pack 26'.

Figure 3:
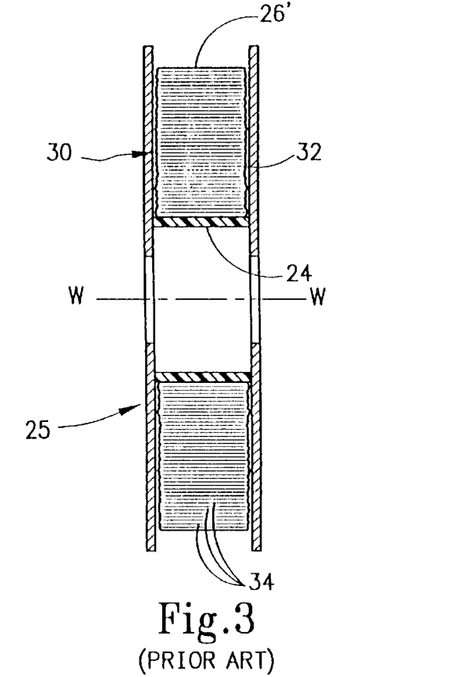
FIG. 3 is a cross-sectional view of a tape reel and tape pack according to the typical prior art.

Thus, as is depicted in FIG. 3, when a tape pack 26' is wound onto a hub 24' of a reel 25, tape pack 26' has a first surface 30 and a second surface 32 wherein the adjacent layers of the tape medium are laterally offset with respect to one another in a direction parallel to wind access "W". This offset is known alternatively as "gstagger-wrap" or "scatterwind". In current applications, this air entrainment causes stagger wrap often in a range of 0.010 to 0.040 inches (about 0.25 to 1.0 mm) of side-to-side stagger. When a stagger wrapped tape pack is rapidly unwrapped, the misregistration causes a perturbation to the tape which is under tension from the drive 16. This perturbation causes the tape to vibrate which in turn may result in errors in data transcription between the tape 14 and the read/write transducer 12.

Figure 4:
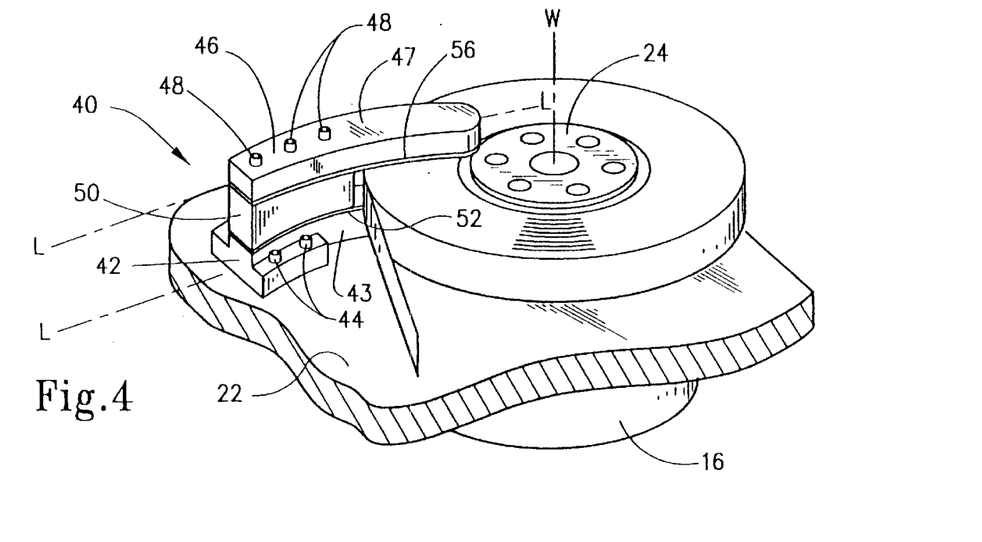
FIG. 4 is a perspective view of a take-up hub according to the first exemplary embodiment of the present invention as shown in FIG. 1.
Figure 5:
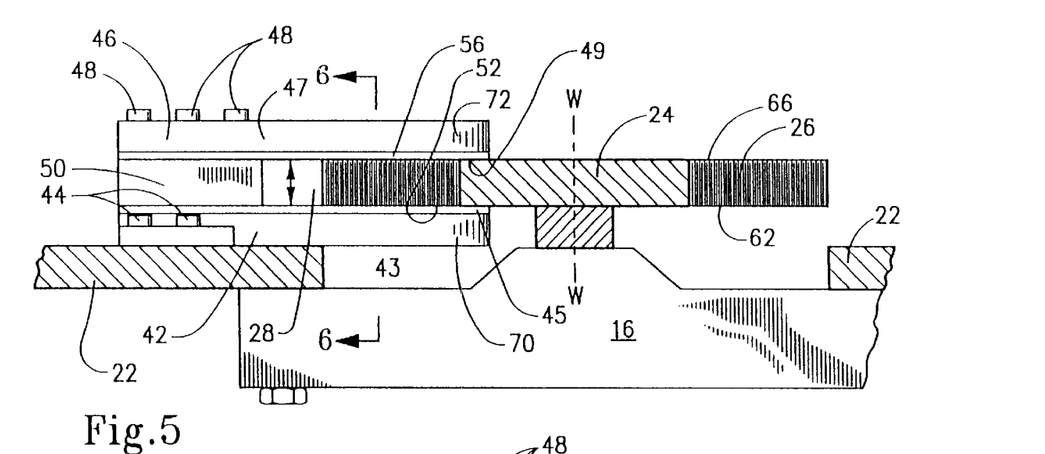
FIG. 5 is a side view in partial cross-section of the take-up hub and packing guide of FIG. 4.
Figure 6:
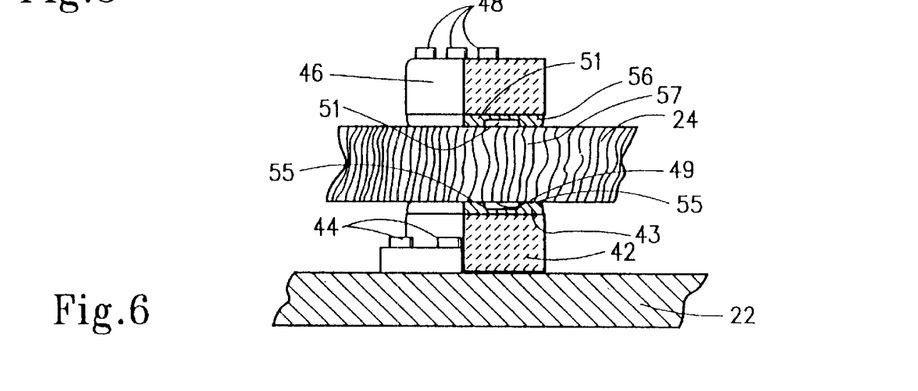
FIG. 6 is a cross-sectional view taken about lines 6—6 of FIG. 5.

With reference now to FIGS. 4–6, a first exemplary embodiment of tape guide 40 is shown mounted to frame 22 in FIG. 4. Tape guide 40 is preferably used with a flangeless hub 24 that is rotatable with respect to frame 22 by drive 16. Tape guide 40 includes a first rigid mount 42 that is secured to frame 22 by a suitable fastener 44. Mount 42 includes a rigid arm portion 43 that projects toward hub 24. A second rigid mount 46 is secured to first mount 42 by a plurality of fasteners 48, and mount 48 includes a rigid arm portion 47 that projects toward hub 24. A precisely formed spacer block 50 is interposed between mounts 42 and 46, and a first ceramic plate 52 is sandwiched between spacer block 50 and first mount 42. Likewise, a second ceramic plate 56 is sandwiched between spacer block 50 and second mount 46.

Plates 52 and 56 are preferably formed of a nonferrous material. The preferred material is a ceramic, such as alumina, but other material known in the art could be employed in the fabrication of plates 52 and 56. Moreover, it is preferred that the surfaces of plates 52 and 56 which come in contact with first and second surfaces 62 and 66 of tape pack 26 be highly polished so as to reduce frictional contact between each of plates 52, 56 and tape pack 26.

With reference to FIG. 6, it may be noted that each of rigid arm portions 43 and 47 are provided with a longitudinally extending groove, 49 and 51, respectively. Each groove 49, 51 is formed in the respective surface 52 and 56 so as to form a pair of ribs 55 and 57 that contact the tape pack. These channels are believed to facilitate the exit of air at the nip when the tape is wound onto the tape pack.

The thickness of plates 52 and 56 are precision formed so that, in combination with spacer block 50, the distance "d" between the facing contact surfaces are separated by a precise length of distance "d". If desired, plate 52 may be affixed to mount 44 by any suitable adhesive and, likewise, plate 56 may be secured to mount 46 by any suitable adhesive. It should also be understood that it is possible to construct each of mounts 42 and 46 so that their respective arms 43 and 47 are formed entirely of a nonferrous material such as a suitable ceramic that is polished at faces 45 and 49.

Figure 7:
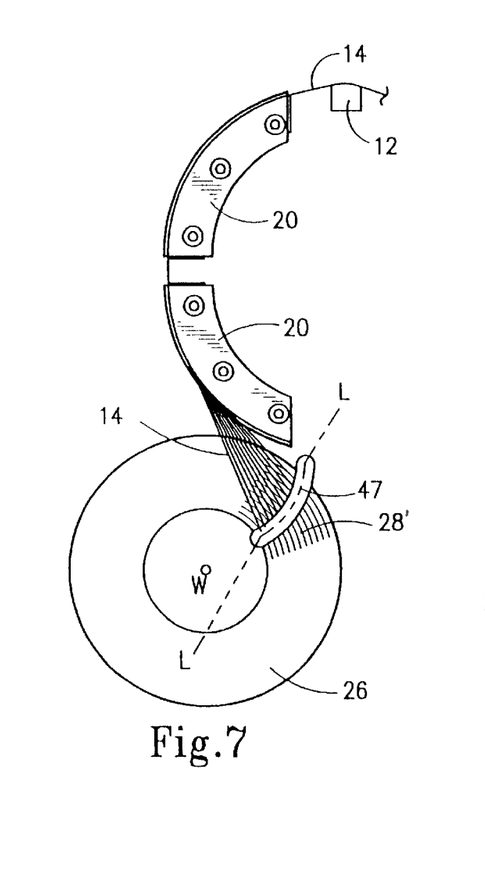
FIG. 7 is a diagrammatical illustration of the wrapping of the tape medium onto a take-up reel showing the location of the nip.

Moreover, with reference to FIG. 7, it may be seen that nip 28 is located along an arcuate line 28' as the diameter of tape pack 26 changes. Accordingly, each of the packing arms 43 and 47 may be arcuate in configuration and oriented such that the respective contact surface always contacts to the first and second surfaces of the tape pack 26 adjacent to the nip so that the nip is located between each of packing arms 43 and 47. With respect to the embodiment shown in FIGS. 4–6, packing arms 43 and 47 are elongated and arcuate in shape with the curvature being determined based on the geometry of the curvatures of the nip for a particular application. Each packing arm 43 and 47 extend generally along a longitudinal axis "L" that does not intersect the wind axis "W". As is shown in FIGS. 4–6, packing arms 43 and 47 have end portions 70 and 72 that overlap hub 24 and end portions 74 and 76 that are secured to mounts 42 and 46. Each of the packing arms thus has a radial length and a circumferential length relative to wind axis "W", and it is desired that the radial length be greater than the circumferential length so as to overlap the nip.

Figure 8:
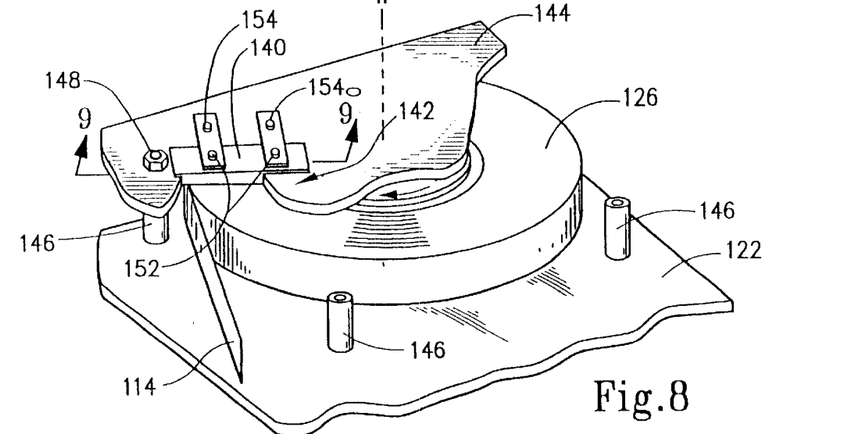
FIG. 8 is a perspective view of an alternative embodiment of the take-up hub and packing guide according to the present invention.
Figure 9:
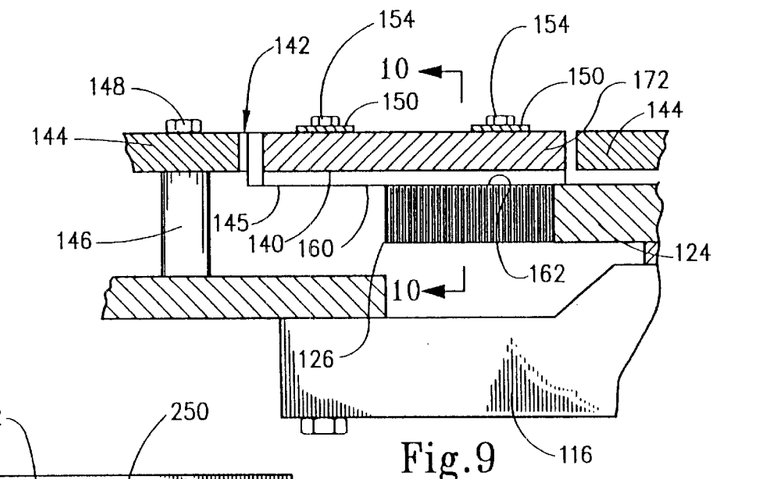
FIG. 9 is a side view in partial cross-section showing the take-up hub and packing guide of FIG. 8 taken about lines 9—9 thereof.
Figure 10:
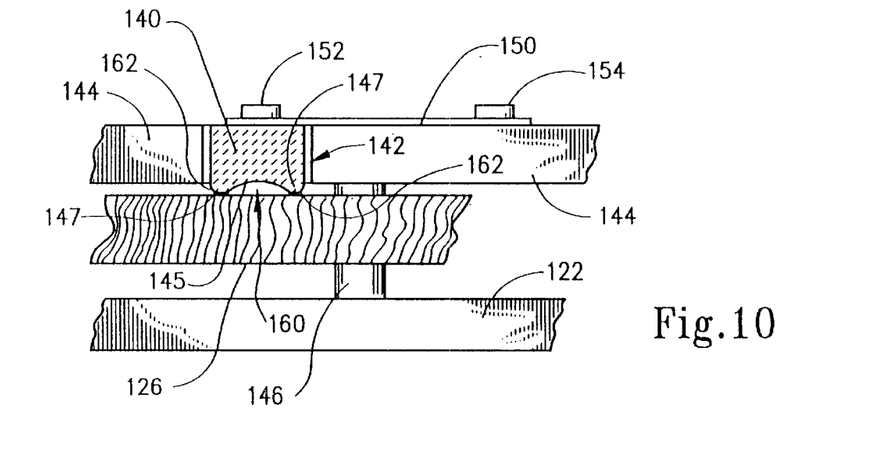
FIG. 10 is a cross-sectional view taken about lines 10—10 of FIG. 9.

With reference now to FIGS. 8–10, a second embodiment of the present invention is depicted. Here, a packing arm 140 is shown to include a packing arm in the form of a solid piece of ceramic material that is supported in an opening 142 formed in a cover plate 144. Packing arm 140 again has a longitudinal groove 145 separating the contact surface into a pair of parallel ribs 147. Cover plate 144 is secured to frame 122 by means of a plurality of stand-offs 146 by fasteners 148. Stand-offs 146 are precision spacers so that plate 144 is held in a parallel space-apart relation to frame 122. Packing arm 140 is supported in opening 142 by a pair of parallel, spaced-apart leaf springs 150 having first ends secured to packing guide 140 by means of fasteners 152 and to mounting plate 144 by means of fasteners 154. Leaf springs 150 resiliently bias packing arm 140 into contact with a first surface 162 of tape pack 126 so that the polished contact surface 160 of packing arm 140 acts at the nip location of the tape to form tape pack 126. Thus, tape pack 126 is wound onto hub 124 by drive 116 with the lateral edges of the tape 114 being more uniformly registered.

Figure 11:
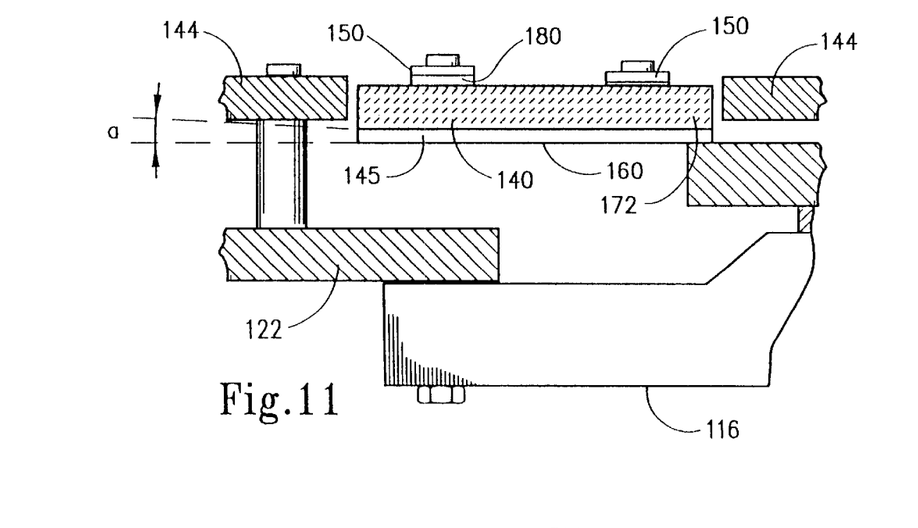
FIG. 11 is a side view in partial cross-section, similar to FIG. 9, showing a modification of the mounting structure for the packing element of FIG. 9.

As is shown in FIG. 9, a first end portion 172 of packing arm 140 overlaps hub 124. Moreover, if desired, packing arm 140 may have rounded edges 162 that are formed as a radius to reduce the potential for damage to the edges of tape 114. As is shown in FIGS. 8 and 10, resilient springs 150 bias surface 160 into contact with first surface 162. Due to the overlap, however, of distal end portion 72 on hub 124, surface 160 may form a small acute angle with respect to a plane that is perpendicular to wind access "W" when the hub is empty or when the tape pack has a small radius (FIG. 11). As is shown in FIG. 11, this angle "a" may be enhanced if desired, by the inclusion of a small spacer washer 180. In either event, it is desired that the spring force of leaf springs 150 apply a force of approximately 1.0 to 3.0 grams of force laterally on the edge of the tape forming the tape pack 126.

Figure 12:
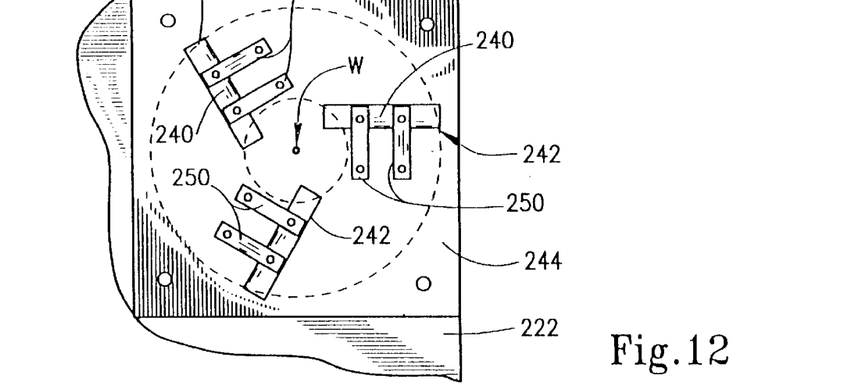
FIG. 12 is a top plan view showing a third exemplary embodiment of the packing guides according to the present invention.

With reference now to FIG. 12, a second alternative embodiment of the present invention is shown. In this embodiment, a plurality of packing arms 240 are each constructed similarly to that described with respect to FIGS. 1–11 so that each packing arm 240 is disposed in an opening 242 in a mounting plate 244. Mounting plate 244 is again in parallel spaced apart relation to frame 222. In the embodiment shown in FIG. 12, each of guide arms 240 are linear plates each supported by a respective leaf spring 250. Packing arms 240 are spaced equiangularly around wind axis W.

Figure 13:
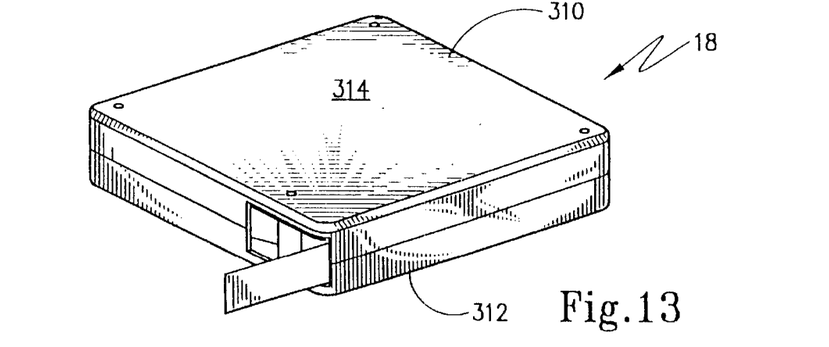
FIG. 13 is a perspective view of a tape cartridge including the packing guide according to another alternative embodiment of the present invention.
Figure 14:
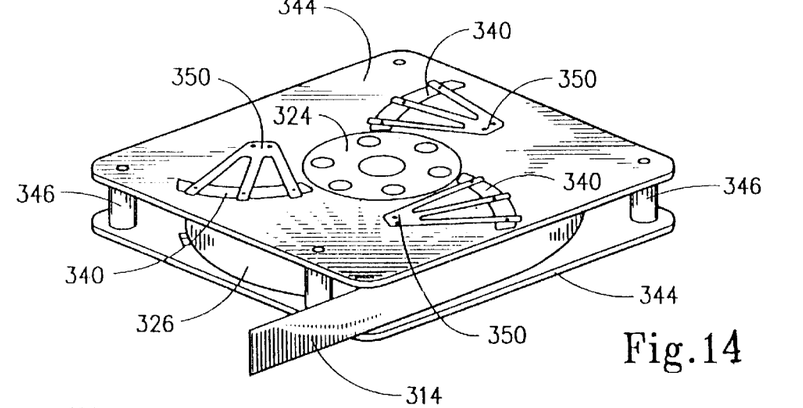
FIG. 14 is a perspective view of the tape cartridge of FIG. 13 having the housing removed therefrom.
Figure 15:
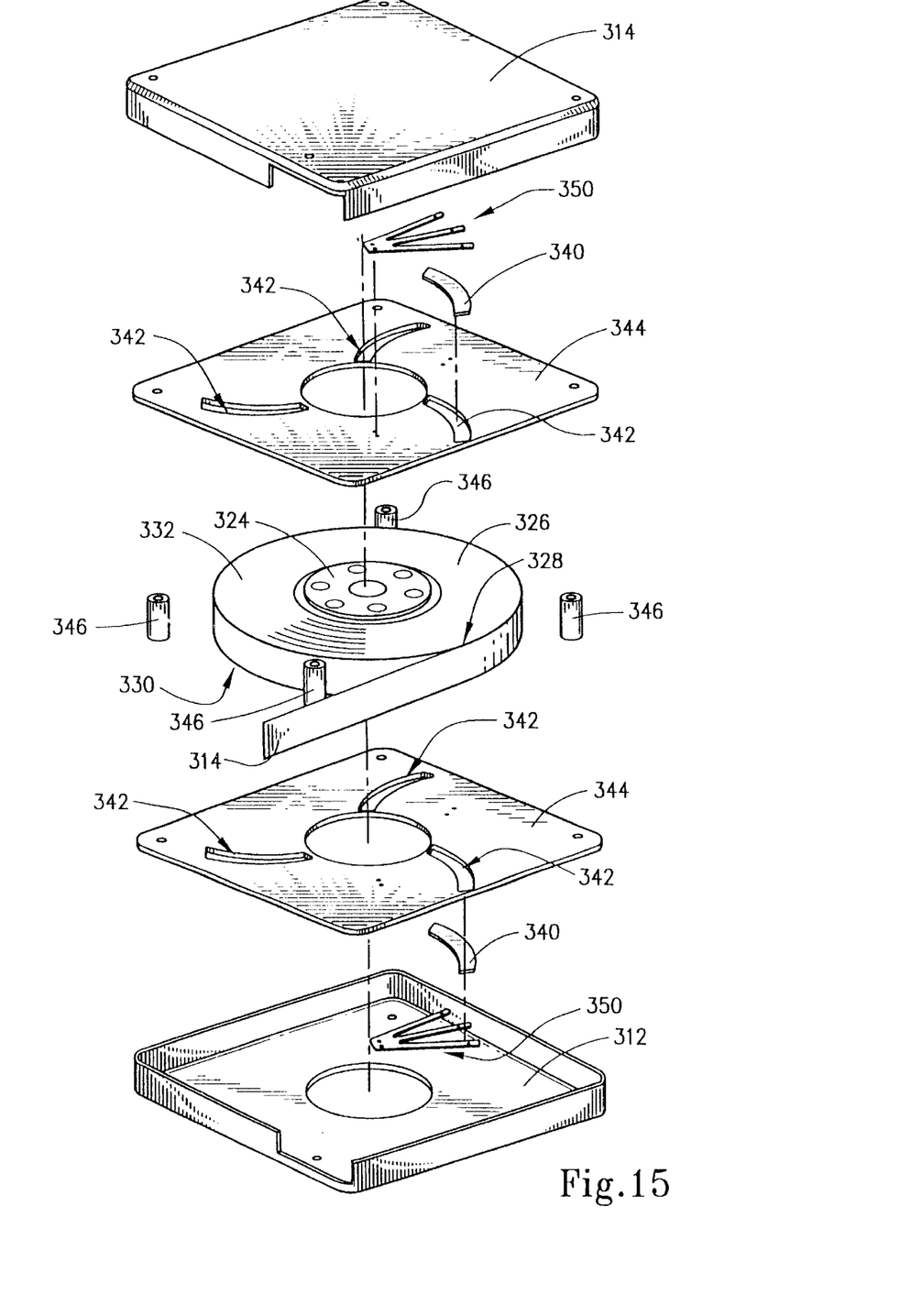
FIG. 15 is an exploded perspective view of the tape cartridge of FIGS. 13 and 14.

As noted above, the tape guide structure of the present invention may be incorporated into a tape cartridge. With reference to FIGS. 13–15, then, a tape cartridge 18 is shown to have a housing 310 formed by confronting housing sections 312 and 314 so as to support a tape 14 as it winds and unwinds from a tape pack 326. To this end, housing section 312 has an access opening 313 provided so that a drive may engage a hub 324 supported in housing 310. A pair of mounting plates 344 are mounted to each other and housing sections 312 and 314 by means of precision stand-offs 346. Mounting plates 344 rotatably support a hub 324 for rotation in housing 310 with plates 344 having openings 345 formed therein to receive hub 324.

Three equiangularly spaced openings 342 are formed in each of plates 344 with openings 342 being elongate and arcuate in shape. A respective packing element 340 is then disposed in each of openings 342 with each block 340 being supported in the opening 342 by a three fingered leaf springs 350 so that each packing element 340 is resiliently biased, respectively, into contact with the first and second surfaces 330 and 332. One of the arcuate openings 342 is oriented so that its respective packing arm 340 extends arcuately along the nip 328 as it fills radially outwardly from hub 324.

Figures 16, 17, 19:
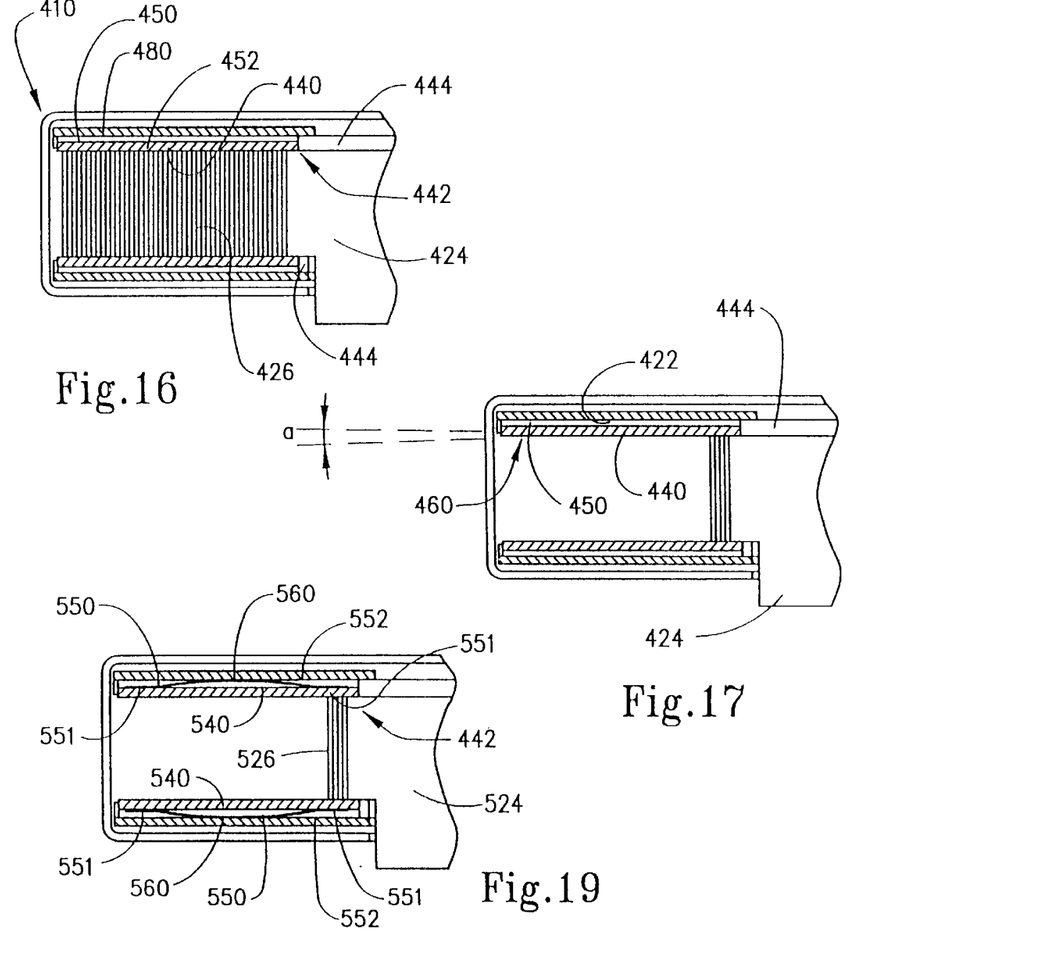
FIG. 16 is a cross-sectional view of a portion of the cartridge of showing a full tape pack with an alternative biasing element.
FIG. 17 is a cross-sectional view similar to FIG. 16 but showing the guide element against the surface of a an almost empty tape pack.
FIG. 19 is a cross-sectional view, similar to FIG. 16, showing another alternative biasing element.
Figures 18, 21:
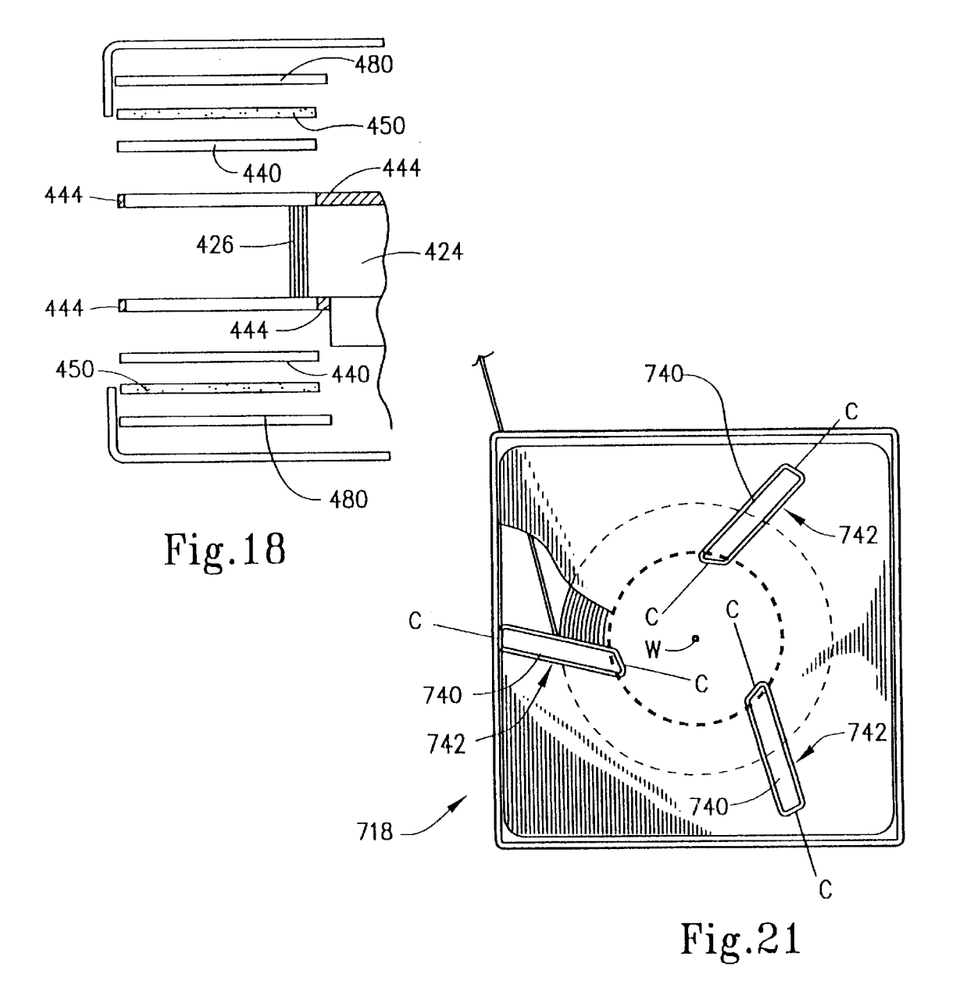
FIG. 18 is an exploded side view in partial cross-section of the structures shown in FIGS. 16 and 17.
FIG. 21 is a top plan view, partially broken away, showing a final embodiment of the present invention.

As an alternative to using leaf springs 350 and as is shown in FIGS. 16–18, the resilient biasing force may be provided by any suitable elastomeric material, for example, a low durometer rubber. Thus, as is seen in FIGS. 16–18, cartridge 410 rotatably supports hub 420 that is secured between mounting plates 444 that are similar in construction to that described with respect to FIGS. 14 and 15. Mounting plates 444 have openings such as opening 442 in which are received packing guides 440 in the form of thin plates of ceramic material. An elastomeric material 450 is adhered to each plate 440 and the laminated structure comprising guide 440 and elastomer 450 are retained in the position by a securing plate 480. As is shown in these figures, the packing elements 440 have first end portions that overlap hub 424. If desired, as is shown in FIG. 17, the elastomeric material 450 may be constructed so that the polished contact surface 460 is oriented at a small acute angle with respect to the plane that is perpendicular to the winding axis.

FIG. 19 shows yet another embodiment of the present invention. This structure is substantially identical to that shown in Figires 1618. Here, however, the elastomeric material 450 is replaced by a thin strip 550 of spring material. Strip 550 has a pair of end portions 551 that bear against plate guide arms 540 and a central ached section 560 that bears against a mounting plate 552. Accordingly, each spring 550 provides a resilient biasing force maintaining contact between packing arms 540 and the tape pack.

Figure 20:
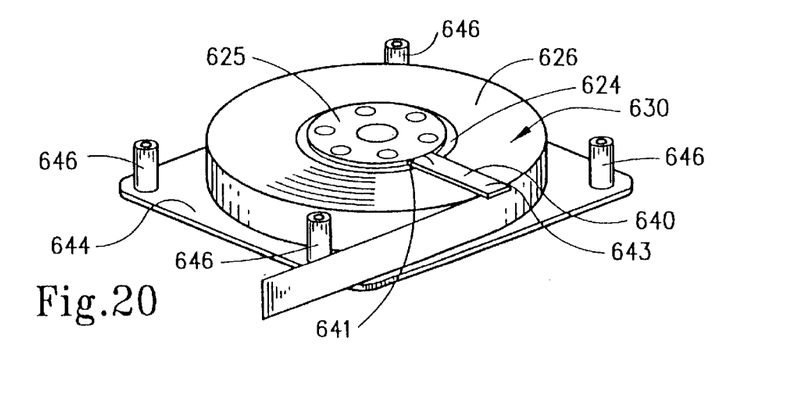
FIG. 20 is a perspective view of yet another embodiment of the present invention having a stationary hub.

With reference now to FIG. 20, another embodiment of the present invention is described. Here, tape pack 626 wraps around a bearing-like hub 624 that is rotatable with respect to a fixed central hub 625. Hub 625 is supported, for example, by means of a plate 644. A plurality of stand-offs 646 are used to mount a second plate (not shown) that is in parallel, spaced-apart relation to plate 644. As may be noted with respect to this figure, packing arm 640 is secured to stationary hub 625 at end 641 and has a free end 643 that projects generally radially outwardly from hub 625 so as to bear against surface 630 of tape pack 626.

Finally, turning to FIG. 21, a still further embodiment of the present invention is depicted. In FIG. 21, cartridge 718 is substantially similar to that described with respect to the embodiment of FIGS. 13–15. Here, however, each packing arm 740 is received in an opening 742 and is biased by means of an elastomeric material such as that described with respect to FIGS. 16–18. It may be noted, however, that each packing arm 740 is oriented along a longitudinal axis "C" that does not intersect the wind axis "W". Each of packing arms 740 has a width sufficient to overlap the nip over the packing region.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:
1. Apparatus operative to wind a tape medium relative to a frame structure where the tape medium is wound with reduced misregistration for play and storage, comprising:
    (a) a hub supported by the frame and operative to wrappingly receive the tape medium;
    (b) a drive operative to engage said hub and to rotatably drive said hub about a wind axis whereby a length of the tape medium is wound thereon to form a spool-like tape pack with a portion of the tape medium entering the tape pack at a tangential nip and with said tape pack having opposite first and second surfaces;
    (c) a rigid packing arm including a first end portion at said hub and extending longitudinally from said hub to a second end portion at the circumference of said tape pack, said packing arm having a contact surface operative to contact the first surface of said tape pack; and
    (d) a support member supporting said packing arm in contact with the first surface of said tape pack.
2. Apparatus according to claim 1 wherein said packing arm has an arcuate configuration such that it always contacts the first surface adjacent to the nip.
3. Apparatus according to claim 1 wherein the contact surface of said packing arm has a longitudinal groove formed therein and located between the first end portion and the second end portion.
4. Apparatus according to claim 1 wherein the first end portion of said packing arm overlaps said hub.
5. Apparatus according to claim 1 wherein said packing arm is resiliently biased into contact with the first surface of said tape pack.
6. Apparatus according to claim 5 including an elastomeric material operative to bias said packing arm into contact with the first surface of said tape pack.
7. Apparatus according to claim 5 including a leaf spring operative to bias said packing arm into contact with the first surface of said tape pack.
8. Apparatus according to claim 1 wherein said packing arm is constructed of a non-ferrous material.
9. Apparatus according to claim 8 wherein said packing arm is constructed of a ceramic material with the contact surface being polished.
10. Apparatus according to claim 1 including a plurality of rigid packing arms each including a first end portion at said hub and extending longitudinally from said hub to a second end portion at the circumference of said tape pack, each said packing arm having a contact surface operative to contact the first surface of said tape pack.
11. Apparatus according to claim 10 wherein said packing arms are disposed equiangularly about the wind axis.
12. Apparatus according to claim 10 wherein each said packing arm has an arcuate configuration, one of said packing arms oriented such that it always contacts the first surface adjacent to the nip.
13. Apparatus according to claim 12 wherein the contact surface of each said packing arm has a longitudinal groove formed therein and located between the first end portion and the second end portion of a the respective packing arm.
14. Apparatus according to claim 1 wherein said packing arm is elongated and extends along a longitudinal axis that does not intersect the wind axis.

15. Apparatus according to claim 14 wherein said packing arm has a radial length and a circumferential length, the radial length being greater than the circumferential length.

16. Apparatus according to claim 1 wherein said hub is rotatably disposed in a cartridge housing that is mountable and demountable relative to said frame structure.

17. Apparatus according to claim 16 wherein said packing arm is mounted to said cartridge housing.

18. Apparatus according to claim 1 including a pair of rigid packing arms disposed in opposed relationship to each other, each packing arm including a first end portion at said hub and extending longitudinally from said hub to a second distal end portion at the circumference of said tape pack, a first one of said packing arms having a contact surface operative to contact the first surface of said tape pack and a second one of said packing arms having a contact surface operative to contact the second surface of said tape pack and a support member supporting said packing arms respectively in contact with the first and second surfaces of said tape pack.

19. A tape reel assembly adapted to be mounted to and demounted from a tape drive apparatus for winding a tape medium therein where the tape medium is wound with reduced misregistration for play and storage, comprising:
   (a) a housing;
   (b) a hub rotatably disposed in said housing and operative to wrappingly receive the tape medium thereon to form a spool-like tape pack with a portion of the tape medium entering the tape pack at a tangential nip, said tape pack having opposite first and second surfaces; and
   (c) a rigid packing arm disposed in said housing and including a first end portion at said hub and extending longitudinally from said hub to a second end portion at the circumference of said tape pack, said packing arm having a contact surface operative to contact the first surface of said tape pack.

20. A tape reel assembly according to claim 19 wherein the first end portion of said packing arm overlaps said hub.

21. A tape reel assembly according to claim 19 wherein said packing arm has an arcuate configuration such that it always contacts the first surface adjacent to the nip.

22. A tape reel assembly according to claim 19 wherein the contact surface of said packing arm has a longitudinal groove formed therein and located between the first distal end portion and the second end portion.

23. A tape reel assembly according to claim 19 wherein said packing arm is resiliently biased into contact with the first surface of said tape pack.

24. A tape reel assembly according to claim 23 including an elastomeric material operative to bias said packing arm into contact with the first surface of said tape pack.

25. A tape reel assembly according to claim 23 including a leaf spring operative to bias said packing arm into contact with the first surface of said tape pack.

26. A tape reel assembly according to claim 19 wherein said packing arm is constructed of a non-ferrous material.

27. A tape reel assembly according to claim 19 wherein said packing arm is constructed of a ceramic material with the contact surface being polished.

28. A tape reel assembly according to claim 19 including a plurality of rigid packing arms each including a first end portion at said hub and extending from said hub to a second end portion at the circumference of said tape pack, each said packing arm having a contact surface operative to contact the first surface of said tape pack.

29. A tape reel assembly according to claim 28 wherein said packing arms are disposed equiangularly about the wind axis.

30. A tape reel assembly according to claim 19 including a pair of rigid packing arms disposed in opposed relationship to each other, each packing arm including a first end portion at said hub and extending longitudinally from said hub to a second end portion at the circumference of said tape pack, a first one of said packing arms having a contact surface operative to contact the first surface of said tape pack and a second one of said packing arms having a contact surface operative to contact the second surface of said tape pack.

31. A tape reel assembly according to claim 19 wherein said hub is flangeless.

32. In a tape drive system having a frame, a read/write head disposed on said frame, first and second winding members each disposed on said frame and adapted so that a tape medium may be selectively wound thereon and unwound therefrom to form a respective tape pack, a tape support structure disposed on said frame and operative to support a tape for transport between said first and second winding members and across said read/write head and first and second drives each operative to rotate said first and second winding members, respectively, an improvement comprising a rigid packing arm including a first end portion located proximately to an outer edge of at least one of said winding members and extending from the outer edge to a second end portion at the circumference of said tape pack, said packing arm having a contact surface operative to contact the first surface of a respective tape pack, and a support member supporting said packing arm in contact with the first surface of the respective tape pack.

33. The improvement according to claim 32 wherein said packing arm has an arcuate configuration such that it always contacts the first surface adjacent to the nip.

34. Apparatus according to claim 32 wherein the contact surface of said packing arm has a longitudinal groove formed therein and located between the first end portion and the second end portion.

35. The improvement according to claim 32 including a plurality of rigid packing arms each including a first end portion at said hub and extending longitudinally from said hub to a second end portion at the circumference of said tape pack, each said packing arm having a contact surface operative to contact the first surface of said tape pack.

36. The improvement according to claim 35 wherein said packing arms are disposed equiangularly about the wind axis.

37. The improvement according to claim 32 including a pair of rigid packing arms disposed in opposed relationship to each other, each packing arm including a first end portion at said hub and extending longitudinally from said hub to a second end portion at the circumference of said tape pack, a first one of said packing arms having a contact surface operative to contact the first surface of said tape pack and a second one of said packing arms having a contact surface operative to contact the second surface of said tape pack.

38. The improvement according to claim 32 including a rigid packing arm associated with each of said winding members, each said packing arm including a first end portion located proximately to an outer edge of its respective said winding member and extending from the outer edge to a second end portion at the circumference of its respective said tape pack, said packing arm having a contact surface operative to contact the first surface of its respective tape pack.

* * * * *